(12) United States Patent
Marley (10) Patent No.: US 12,240,607 B2
(45) Date of Patent: Mar. 4, 2025

(54) RETRACTING T DIVIDER

(71) Applicant: B/E Aerospace, Inc., Winston Salem, NC (US)

(72) Inventor: Scott Marley, Edmonds, WA (US)

(73) Assignee: B/E AEROSPACE, INC., Winston Salem, NC (US)

( * ) Notice: Subject to any disclaimer, the term of this patent is extended or adjusted under 35 U.S.C. 154(b) by 125 days.

(21) Appl. No.: 18/102,561

(22) Filed: Jan. 27, 2023

(65) Prior Publication Data
US 2024/0253785 A1 Aug. 1, 2024

(51) Int. Cl.
*B64D 11/04* (2006.01)
(52) U.S. Cl.
CPC .................... *B64D 11/04* (2013.01)
(58) Field of Classification Search
CPC ..................................... B64D 11/04
See application file for complete search history.

(56) References Cited

U.S. PATENT DOCUMENTS

| | | | | | |
|---|---|---|---|---|---|
| 6,010,094 | A * | 1/2000 | Csik | .......................... | E05C 3/04 244/129.1 |
| 10,974,901 | B1 * | 4/2021 | Vlaming | .................. | A47F 1/126 |
| 11,242,149 | B2 | 2/2022 | Brownlie et al. | | |
| 11,390,383 | B2 | 7/2022 | Bajorat et al. | | |
| 11,420,748 | B2 | 8/2022 | Tracey et al. | | |
| 11,529,987 | B2 * | 12/2022 | Dowty | ............... | B64D 11/0007 |
| 2017/0166310 | A1 * | 6/2017 | Wallbott | .................... | B25J 1/04 |
| 2018/0079506 | A1 * | 3/2018 | Hausner | ................ | B64D 9/003 |
| 2019/0023400 | A1 * | 1/2019 | Bitter | ....................... | A47B 57/06 |
| 2019/0031348 | A1 * | 1/2019 | Bajorat | ............. | B64D 11/0007 |
| 2020/0339262 | A1 * | 10/2020 | Claflin | ................... | B64D 11/04 |
| 2021/0047042 | A1 * | 2/2021 | Tracey | ............... | B64D 11/0007 |
| 2021/0078708 | A1 * | 3/2021 | Brownlie | ............... | B64D 11/04 |
| 2021/0122471 | A1 * | 4/2021 | Vlaming | ................. | B65G 1/14 |
| 2022/0127001 | A1 * | 4/2022 | Chylinski | ............. | B64D 11/04 |
| 2022/0153329 | A1 * | 5/2022 | Lange | .................... | B64D 11/04 |

FOREIGN PATENT DOCUMENTS

| | | | | |
|---|---|---|---|---|
| CN | 104507803 | | 4/2017 | |
| EP | 3978365 A1 * | 4/2022 | | ............. A47B 31/06 |
| EP | 3738879 | | 9/2022 | |
| WO | WO-2021037836 A1 * | 3/2021 | | .......... B62B 3/1404 |

OTHER PUBLICATIONS

European Patent Office, European Search Report dated May 13, 2024 in Application No. 23213339.7.

* cited by examiner

*Primary Examiner* — Hanh V Tran
(74) *Attorney, Agent, or Firm* — SNELL & WILMER L.L.P.

(57) ABSTRACT

A T-divider includes a housing defining a proximal end, a distal end, and at least one cavity extending therebetween. The housing extends along a longitudinal axis. The T-divider includes a moveable portion disposed in the housing and extending between the proximal end and the distal end. The movable portion is configured to rotate about the longitudinal axis from a stowed orientation to a removal orientation.

11 Claims, 12 Drawing Sheets

RETRACTING T DIVIDER

FIELD

The present disclosure relates to devices for extracting trolleys from trolley bays such as those found in the galleys of passenger aircraft.

BACKGROUND

Commercial passenger aircraft often feature galley areas where provisions such as food and drink are stored and prepared for in-flight consumption. These provisions are generally stored in wheeled trolleys that can be quickly loaded and unloaded during aircraft turnarounds and which can be wheeled around the cabin to serve passengers during a flight. Galley trolleys are generally stored in galley trolley bays, where they are restrained securely when not in use. When the contents of a trolley is desired, a cabin attendant can release the restraints and pulls the trolley out from the bay, e.g. using a handle on the front of the trolley.

In commercial passenger aircraft galleys, maximizing trolley cart stowage is a key feature for airlines, especially if they operate long haul services. Depending on where a galley is located in an aircraft access door area, the structure of the door including the door bustle can project into the space available for accessing the galley carts, rendering the innermost bay unusable when the door is closed during flight. If a door facing galley has a single cart bay on its innermost side (adjacent to the fuselage) it is impossible to extract a half-size let alone full-size meal service cart from the bay. If a double bay is used, a fixed aluminum rail called a T-divider is used to restrain the carts against side loads. Existing T-dividers are configured to rotate out to the side. However, some rotating T-dividers are not configured to withstand the side loads applied to the T-divider, especially when the trolley is loaded from the side of the aircraft. Thus, an improved approach may be desired.

SUMMARY

A T-divider includes a housing defining a proximal end, a distal end, and at least one cavity extending therebetween. The housing extends along a longitudinal axis. The T-divider includes a moveable portion disposed in the housing and extending between the proximal end and the distal end. The movable portion is configured to rotate about the longitudinal axis from a stowed orientation to a removal orientation.

In various embodiments, the at least one cavity includes a first cavity and a second cavity.

In various embodiments, the T-divider further includes a plurality of restraining lugs disposed within the housing.

In various embodiments, the plurality of restraining lugs are disposed within the first cavity and the second cavity such that the plurality of restraining lugs are disposed on either side of the moveable portion.

In various embodiments, the plurality of restraining lugs are fixed within the housing such that the restraining lugs are configured to restrain the moveable portion in the stowed orientation.

In various embodiments, the T-divider further includes a plurality of recesses disposed along the moveable portion.

In various embodiments, the plurality of recesses are configured to correspond with the plurality of restraining lugs such that the plurality of recesses allow the moveable portion to rotate about the longitudinal axis when the plurality of recesses align with the plurality of restraining lugs.

In various embodiments, the T-divider further includes a central shaft coupled to the moveable portion, the central shaft configured to rotate the moveable portion.

In various embodiments, the T-divider further includes a locking mechanism secure the moveable portion the stowed orientation.

In various embodiments, the moveable portion includes a first portion and a second portion extending perpendicularly from the first portion.

An aircraft galley includes at least one cart, a cart bay configured to store the at least one cart, and a T-divider configured to restrict lateral movement of the at least one cart within the cart bay when the T-divider is in a stowed orientation and allows the at least one cart to be removed from the cart bay around an obstruction when in a removal orientation. The T-divider includes a housing defining a proximal end, a distal end, and at least one cavity extending therebetween. The housing extends along a longitudinal axis. The T-divider includes a moveable portion disposed in the housing and extending between the proximal end and the distal end. The movable portion configured to rotate about the longitudinal axis from a stowed orientation to a removal orientation.

In various embodiments, the at least one cavity includes a first cavity and a second cavity.

In various embodiments, the T-divider further includes a plurality of restraining lugs disposed within the housing.

In various embodiments, the plurality of restraining lugs are disposed within the first cavity and the second cavity such that the plurality of restraining lugs are disposed on either side of the moveable portion.

In various embodiments, the plurality of restraining lugs are fixed within the housing such that the restraining lugs are configured to restrain the moveable portion in the stowed orientation.

In various embodiments, the T-divider further includes a plurality of recesses disposed along the moveable portion.

In various embodiments, the plurality of recesses are configured to correspond with the plurality of restraining lugs such that the plurality of recesses allow the moveable portion to rotate about the longitudinal axis when the plurality of recesses align with the plurality of restraining lugs.

In various embodiments, the T-divider further includes a central shaft coupled to the moveable portion, the central shaft configured to rotate the moveable portion.

In various embodiments, the T-divider further includes a locking mechanism secure the moveable portion the stowed orientation.

In various embodiments, the locking mechanism is a detent pin, a spring, or a magnet.

The foregoing features and elements may be combined in any combination, without exclusivity, unless expressly indicated herein otherwise. These features and elements as well as the operation of the disclosed embodiments will become more apparent in light of the following description and accompanying drawings.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the following detailed description and claims in connection with the following drawings. While the drawings illustrate various embodiments employing the principles described herein, the drawings do not limit the scope of the claims.

DETAILED DESCRIPTION

The following detailed description of various embodiments herein makes reference to the accompanying drawings, which show various embodiments by way of illustration. While these various embodiments are described in sufficient detail to enable those skilled in the art to practice the disclosure, it should be understood that other embodiments may be realized and that changes may be made without departing from the scope of the disclosure. Thus, the detailed description herein is presented for purposes of illustration only and not of limitation. Furthermore, any reference to singular includes plural embodiments, and any reference to more than one component or step may include a singular embodiment or step. Also, any reference to attached, fixed, connected, or the like may include permanent, removable, temporary, partial, full or any other possible attachment option. Additionally, any reference to without contact (or similar phrases) may also include reduced contact or minimal contact. It should also be understood that unless specifically stated otherwise, references to "a," "an" or "the" may include one or more than one and that reference to an item in the singular may also include the item in the plural. Further, all ranges may include upper and lower values and all ranges and ratio limits disclosed herein may be combined.

Figure 1A:
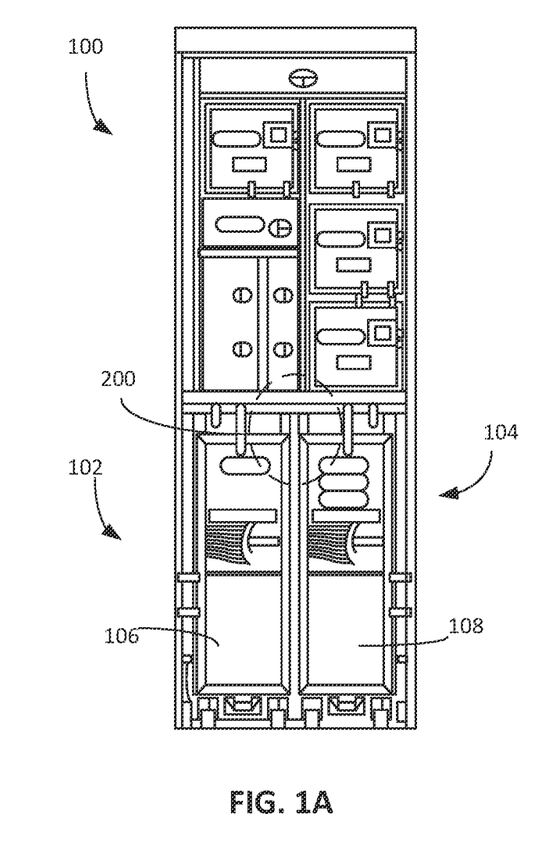
FIG. 1A is a front view of an aircraft galley structure, in accordance with various embodiments.
Figure 1B:
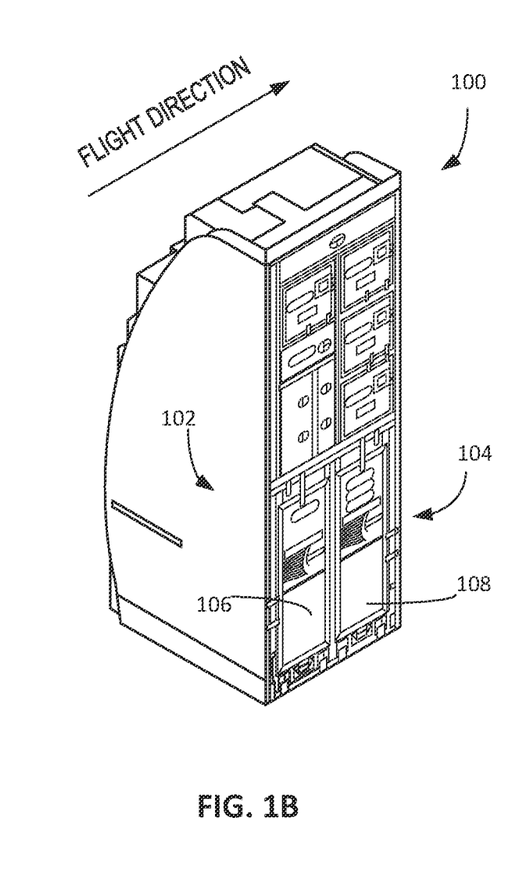
FIG. 1B is a perspective view of the aircraft galley structure of FIG. 1A, in accordance with various embodiments.
Figure 1C:
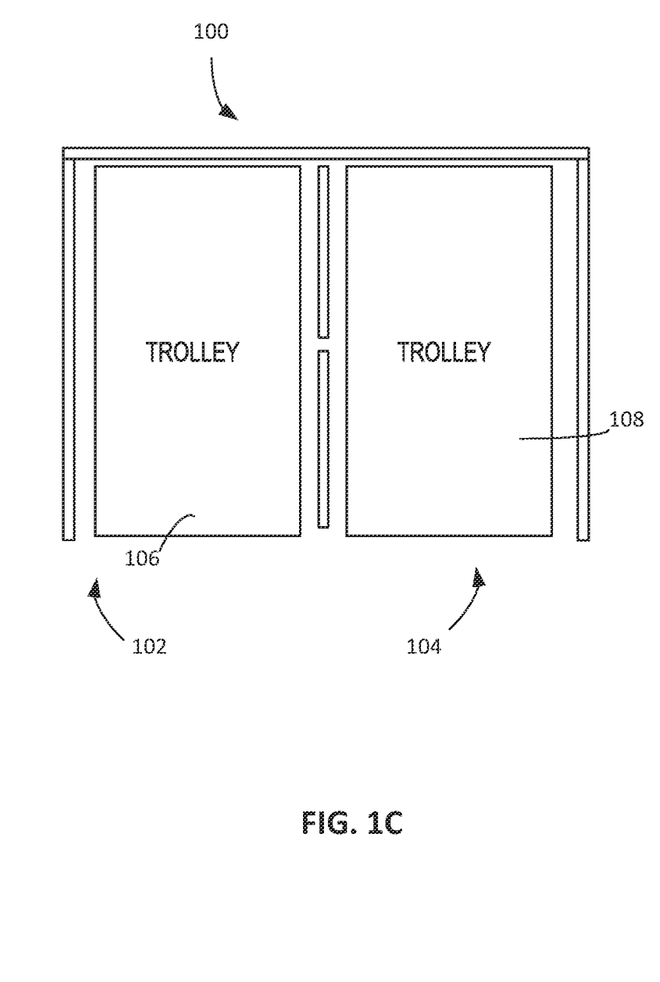
FIGS. 1C-1D are top views of the aircraft galley structure of FIG. 1A, in accordance with various embodiments.
Figure 1D:
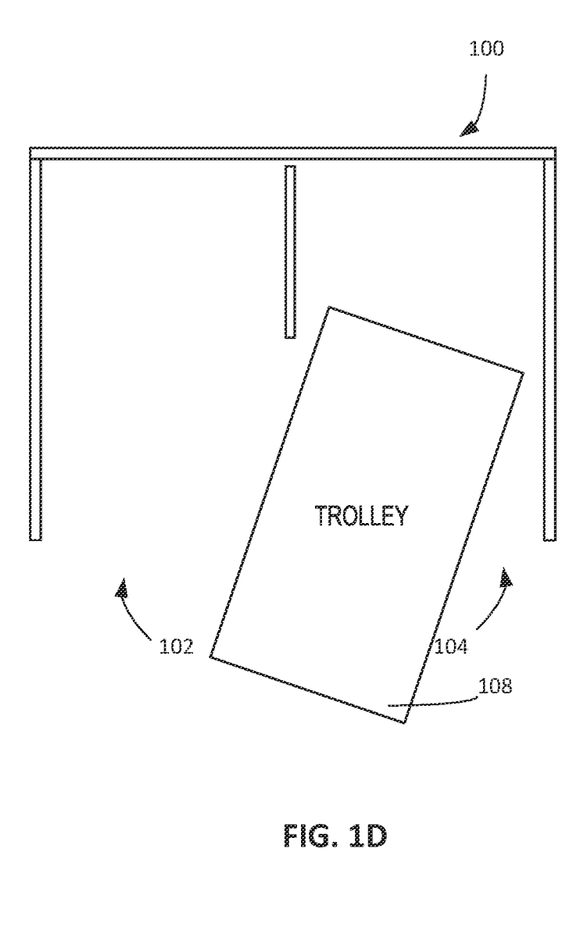
Figure 1E:
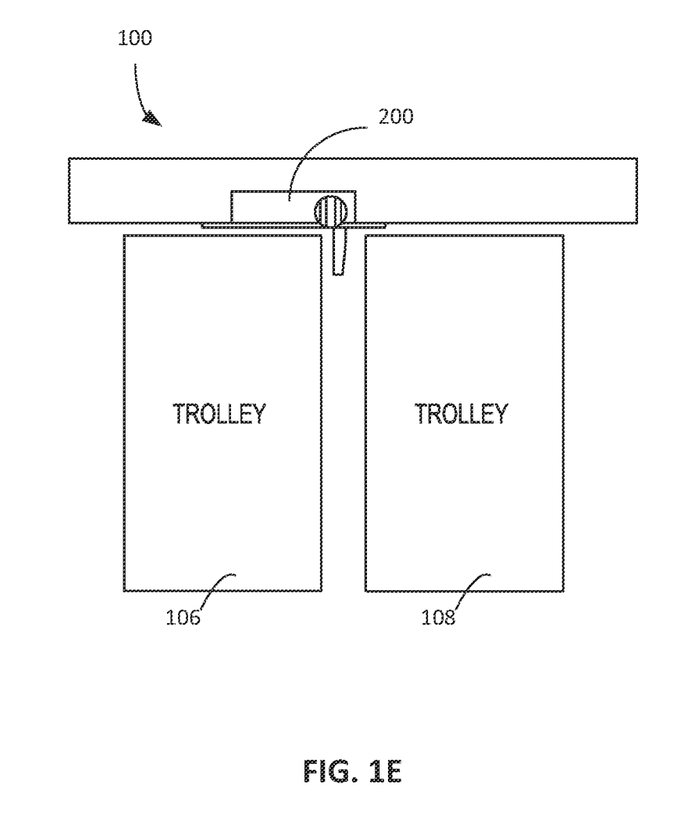
FIGS. 1E-1F are front views of the aircraft galley structure of FIG. 1A, in accordance with various embodiments.
Figure 1F:
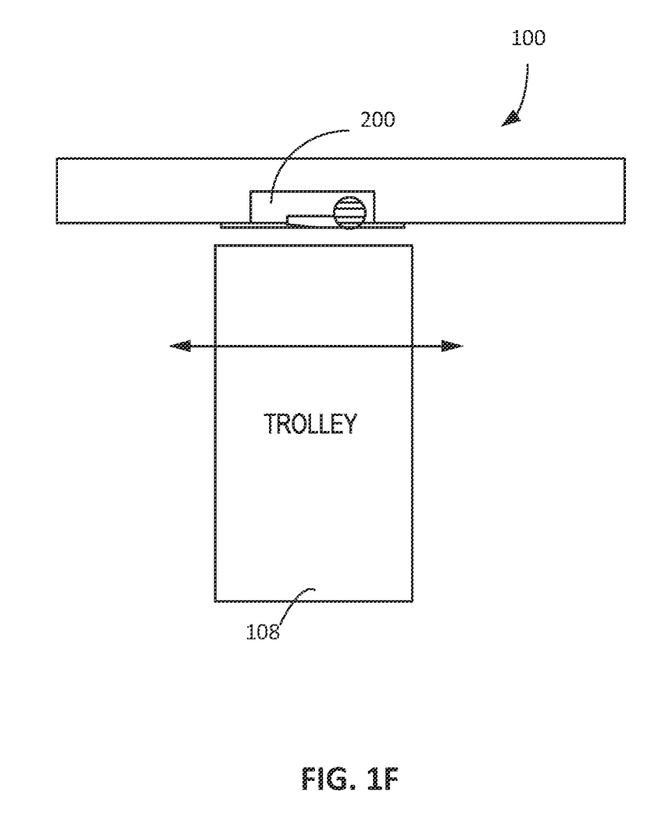
Figure 1G:
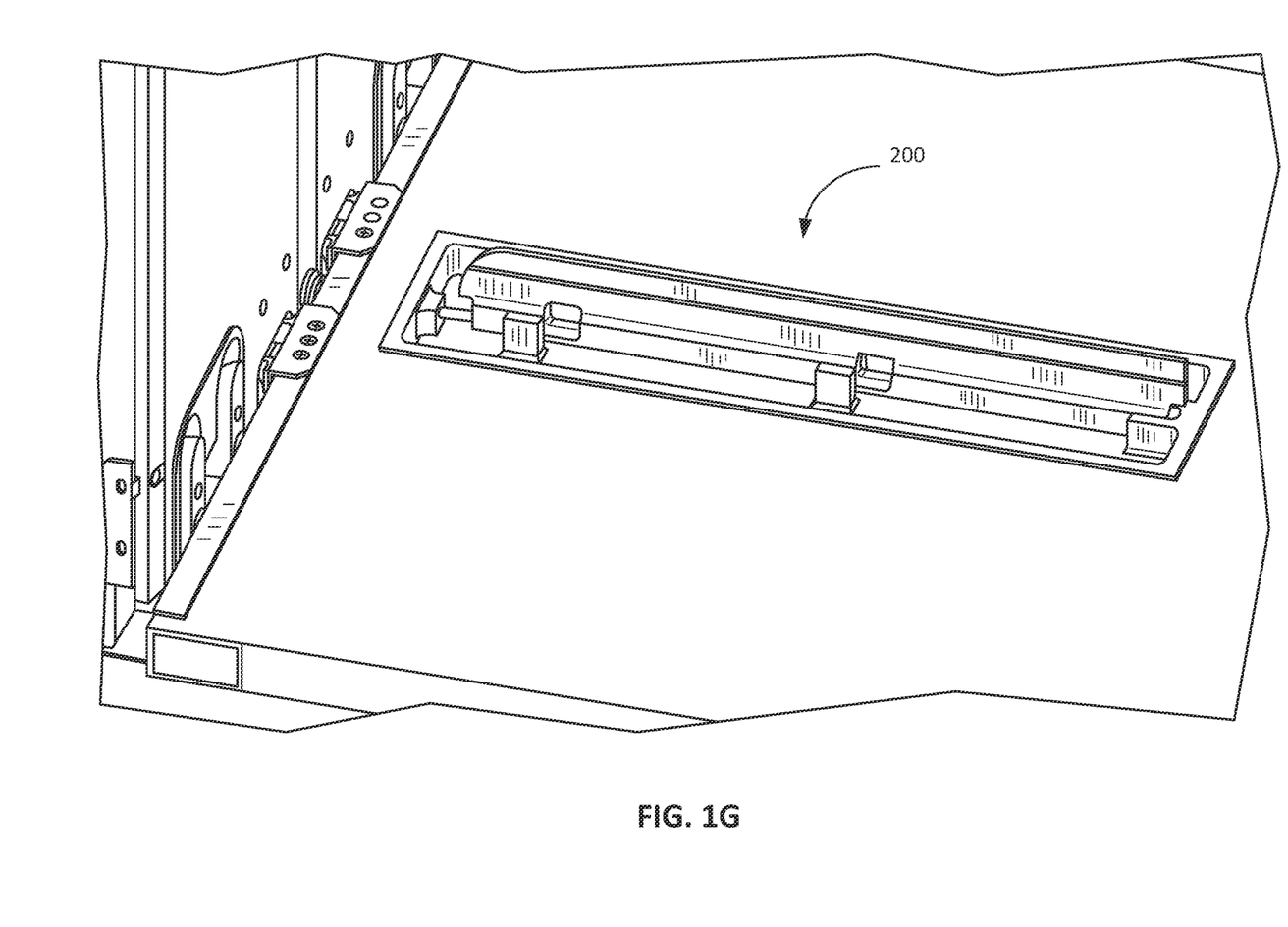
FIG. 1G is a perspective view of a T-divider of the aircraft galley structure of FIG. 1A, in accordance with various embodiments.

Referring now to the drawings, FIGS. 1A-1G illustrate trolley cart stowage bays in accordance with various embodiments. A galley 100 having a plurality of cart storage bays, for instance a first bay 102 and a second bay 104, may be in an area restricted by surrounding aircraft structures such as a door bustle. The first and second cart stowage bays 102, 104 are at least partially defined by a T-divider 200 that restricts lateral movement of carts 106, 108 within the corresponding cart stowage bays 102, 104. The T-divider 200 is configured to take the large loads (e.g., up to 9G of force) that are applied to the T-divider 200 (e.g., against sides of the T-divider 200 as will be explained herein) in a flight direction when the aircraft is in motion, while still allowing the carts 106, 108 to be removed from the cart stowage bays 102, 104. The flight direction may be in the direction as shown in FIG. 1B (e.g., forward-aft), or the flight direction may be any of 4 natural orientations (e.g., forward-aft, aft-forward, left-right, right-left).

The galley 100 may have at least one cart stowage bay (e.g., the first bay 102 and the second bay 104), or may include double cart stowage bays. The T-divider 200 defines a boundary between the first bay 102 and the second bay 104. The first and second cart stowage bays 102, 104 may be restricted by surrounding aircraft structures: to facilitate removal of a cart during flight, a moveable portion of the T-divider 200 may be deflected from a stowed orientation (e.g., see FIG. 1E) to a removal orientation (e.g., see FIG. 1F). For instance, in various embodiments, where carts are removed from the unrestricted first cart bay 102, the T-divider may be placed in the removal orientation, such that the cart 108 can be removed around the surrounding aircraft structure, either moving from side-to side (e.g., see FIGS. 1E-1F) or at an angle (e.g., see FIGS. 1C-1D), as necessary.

Figures 2A, 2B:
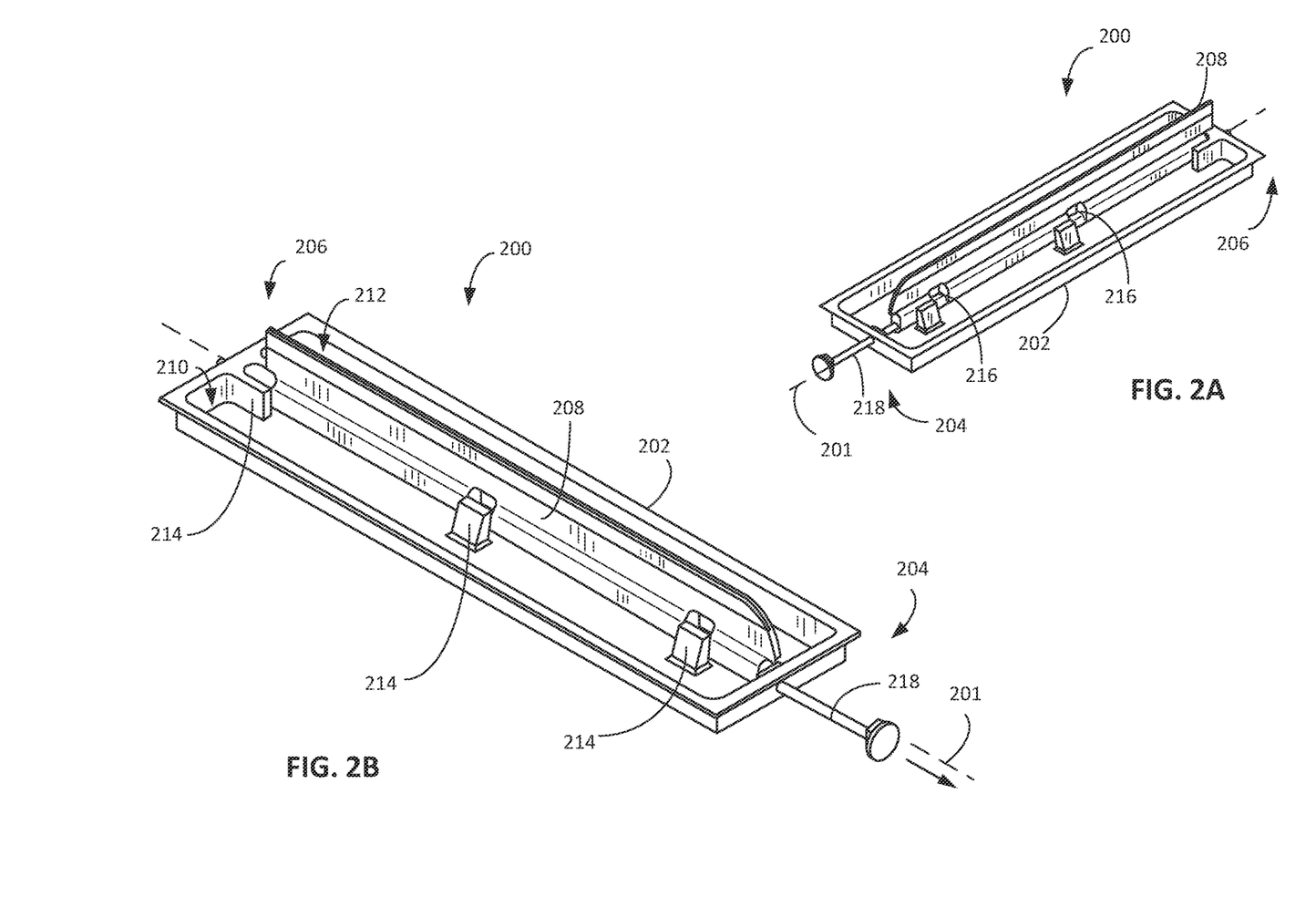
FIGS. 2A-2C are perspective views of a T-divider, in accordance with various embodiments.
Figure 2C:
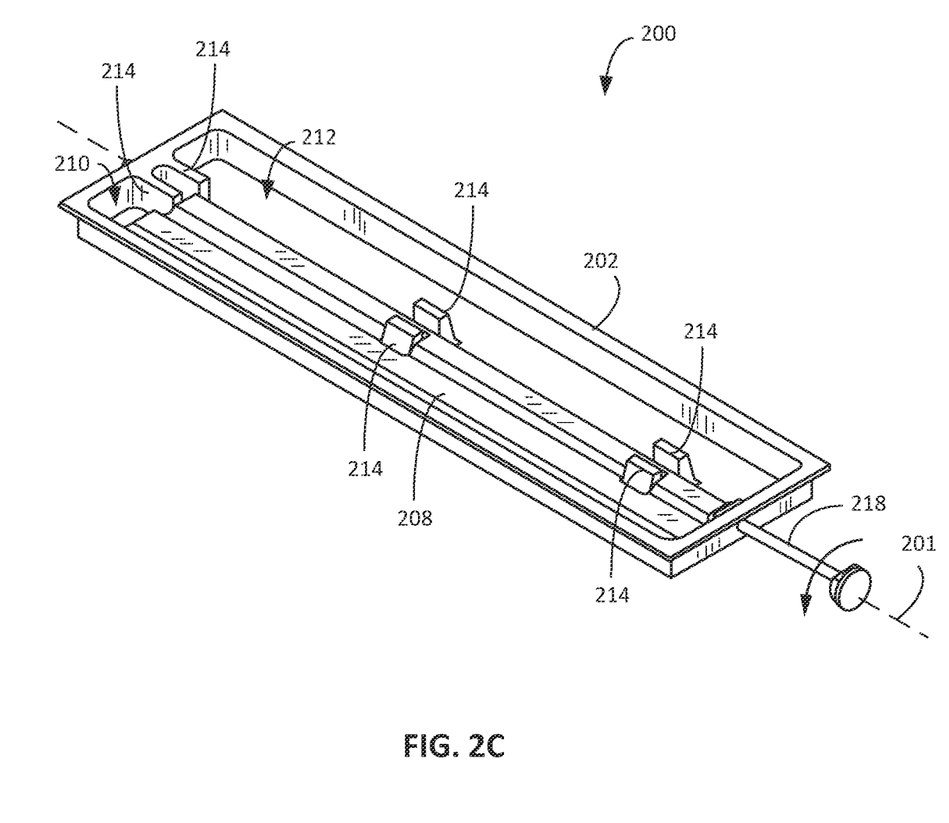
Figure 2D:
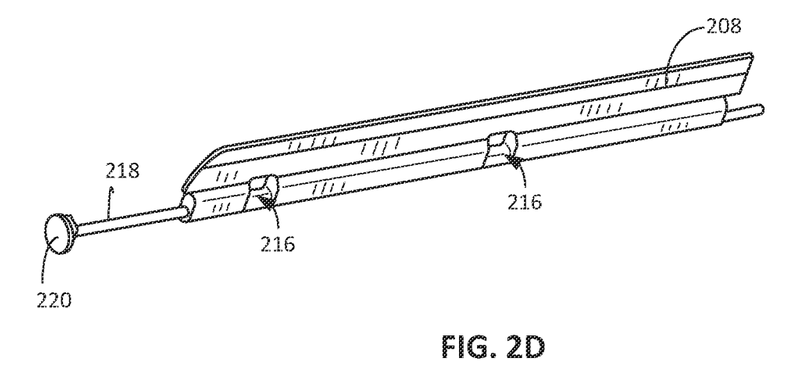
FIGS. 2D-2E are detailed views of the T-divider of FIGS. 2A-2C, in accordance with various embodiments.
Figure 2E:
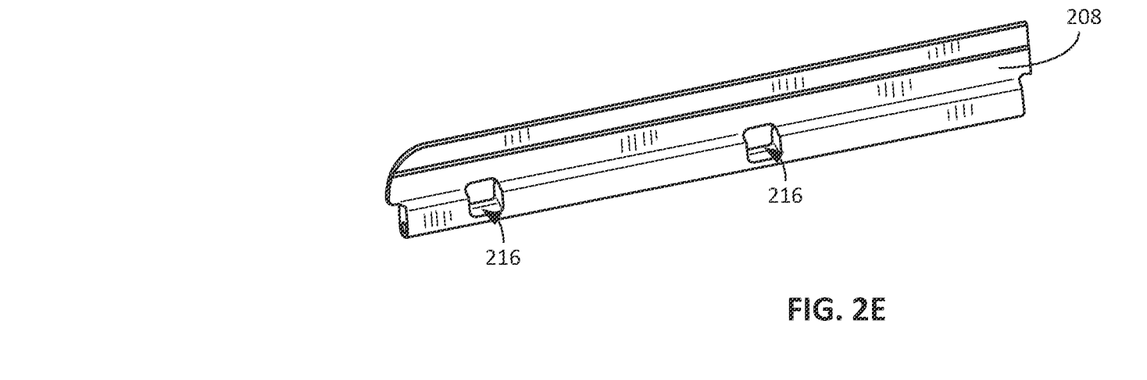
Figures 5A, 5B:
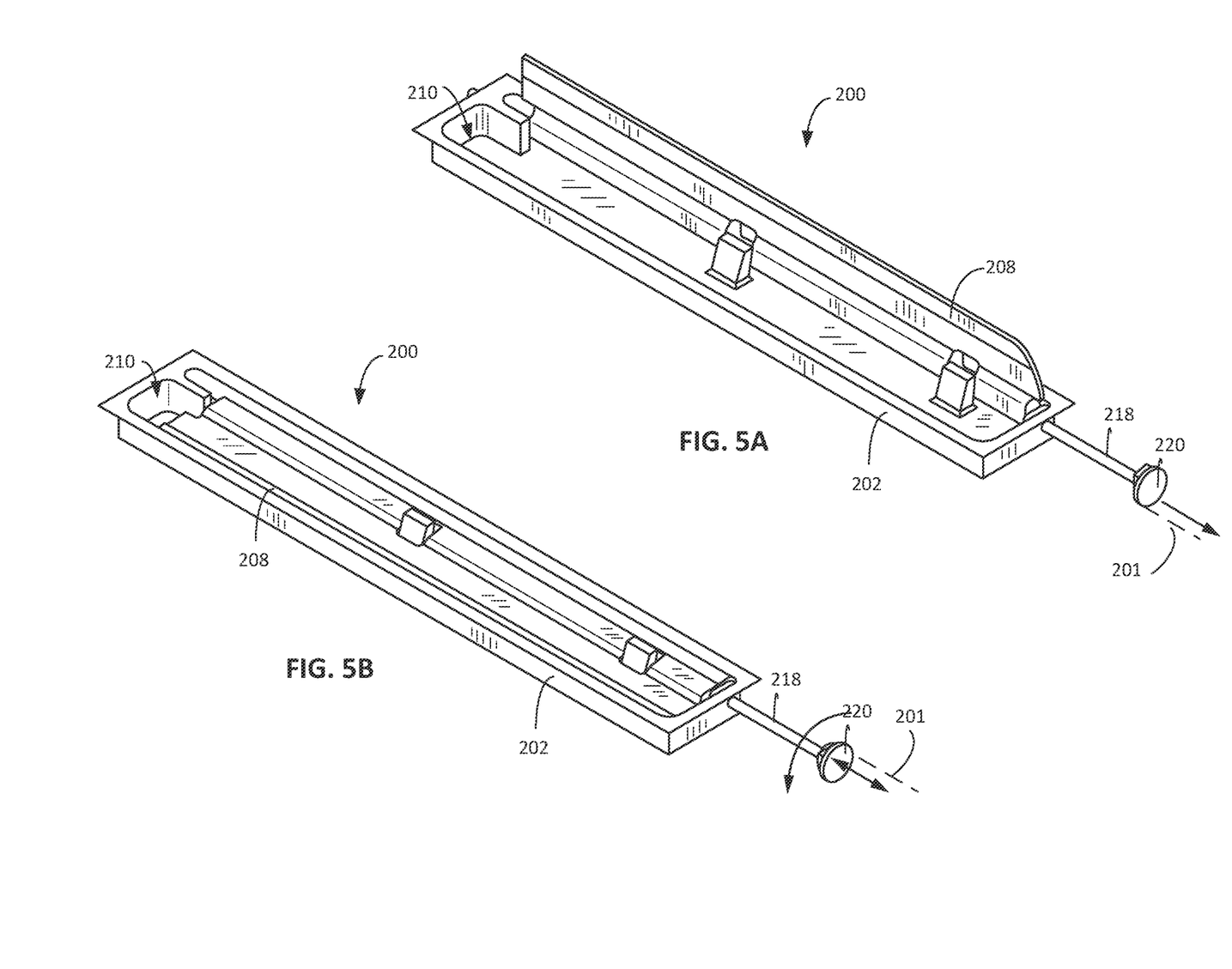
FIGS. 5A-5B are perspective views of a T-divider, in accordance with various embodiments.

Referring now to FIGS. 2A-2E, a T-divider 200 (e.g., a T-divider assembly 200) is illustrated in detail. The T-divider 200 includes a housing 202. The housing 202 may be configured to be disposed within the galley 100. The housing 202 may be substantially rectangular. The housing 202 may be any shape suitable to be disposed in/coupled to the galley 100. The housing 202 may define the boundary between the first stowage bay 102 and the second stowage bay 104. The housing 202 includes a proximal end 204 and a distal end 206, opposite the proximal end 204. The distance between the proximal end 204 and the distal end 206 may define a length L of the housing 202 along a longitudinal axis 201. The housing 202 may include at least one cavity. For instance, as shown in FIGS. 2A-2C, the housing 202 may include a first cavity 210 and a second cavity 212. The first and second cavities 210, 212 may extend between the proximal end 204 and the distal end 206. In various embodiments, as shown in FIGS. 5A-5B, the housing 202 may include only one cavity (e.g., the first cavity 210).

The T-divider 200 may include a moveable portion 208. The moveable portion 208 may be a panel extending between the proximal end 204 and the distal end 206 of the housing, substantially the length of the length L. The moveable portion 208 may be disposed in a center of the housing 202 such that the moveable portion 208 separates the first cavity 210 and the second cavity 212. The moveable portion 208 is configured to rotate about the longitudinal axis 201 within the housing 202. For instance, the first and second cavities 210, 212 may be configured to receive the moveable portion 208 as it rotates from the stowed orientation to the removal orientation. In configurations that include the first cavity 210 and the second cavity 212, the moveable portion 208 may be rotated in either direction (e.g., a clockwise or a counterclockwise direction). In configurations that include only the first cavity 210, the moveable portion 208 may be rotated in a single direction (e.g., either a clockwise or a counterclockwise direction) (see e.g., FIGS. 5A-5B). In various embodiments, the moveable portion 208 may include a rub strip. For instance, the rub strip may be disposed along a surface of the moveable portion 208 and configured to prevent damage to the moveable portion 208. The rub strip may be a rubber, silicone, or other abrasion resistant material.

The T-divider 200 may include a plurality of restraining lugs 214. The plurality of restraining lugs 214 may be disposed within the housing 202 on either side of the moveable portion 208 (e.g., a plurality of restraining lugs 214 within the first cavity 210 and a plurality of restraining lugs 214 in the second cavity 212). The plurality of restraining lugs 214 may be fixed within the housing 202 such that the restraining lugs 214 are configured to restrain the moveable portion 208 in the stowed orientation.

The T-divider 200 may include a plurality of recesses 216. The plurality of recesses 216 may be configured to correspond with the plurality of restraining lugs 214. For instance, when the plurality of recesses 216 align with the plurality of restraining lugs 214, the moveable portion 208 may be allowed to rotate along the longitudinal axis such that the plurality of restraining lugs 214 pass through the plurality of recesses 216 during rotation.

The T-divider 200 may include a central shaft 218. The central shaft 218 may be configured to enable a user, such as a flight attendant, to rotate the moveable portion 208 of the T-divider 200 from the stowed orientation to the removal orientation, and vice versa. In various embodiments, the central shaft 218 may be coupled to the moveable portion 208. For instance, the central shaft 218 and the moveable portion 208 may be configured as one integral piece. In various embodiments, the central shaft 218 may be configured to slide through a channel of the moveable portion 208 such that the central shaft 218 acts as a bearing. The central shaft 218 may extend at least the length of the housing. For instance, a portion of the central shaft 218 may extend past the distal end 206 of the housing 202 such that when the central shaft 218 is pulled proximally, as described further herein, a portion of the central shaft 218 remains on an exterior side of the housing 202 to remain aligned/engaged with the housing 202. The central shaft 218 may include a knob 220. The knob 220 may be disposed on the central shaft 218 toward the proximal end 204. The knob 220 may further facilitate the user to operate the T-divider.

Figure 3A:
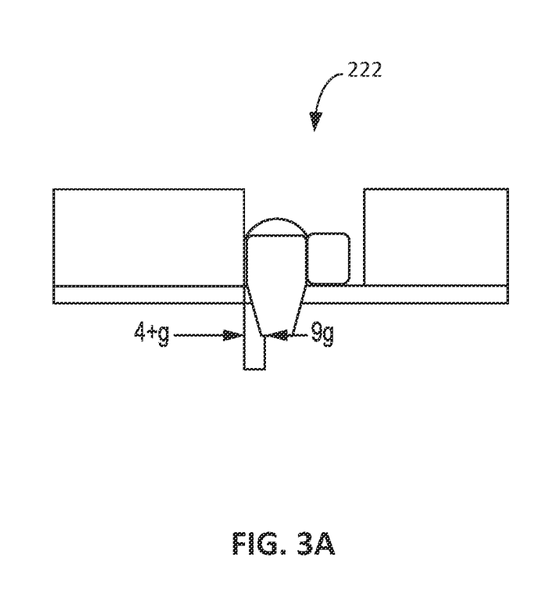
FIGS. 3A-3B are front views of a locking mechanism of a T-divider, in accordance with various embodiments.
Figure 3B:
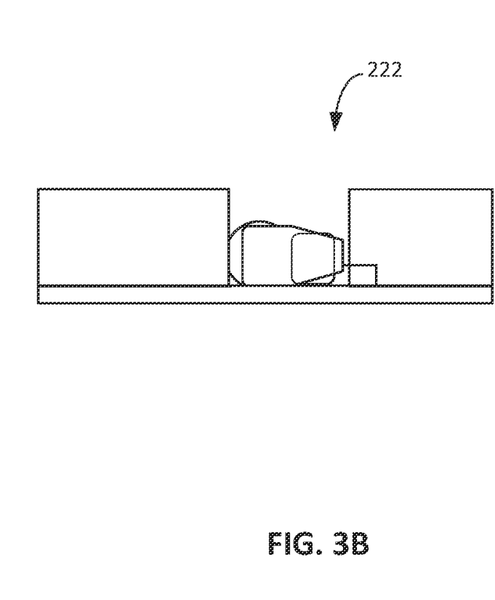

Referring now to FIGS. 3A-3B, the T-divider 200 may include a locking mechanism 222. The locking mechanism 222 may be configured to prevent unintended pull of the knob 220. Accordingly, the moveable portion 208 may be secured in the stowed orientation 206 via the locking mechanism 222. The locking mechanism 222 may be a push pin that blocks rotation. For instance, a lever can be balked with a door. When the door is removed, the lever is visible, similar to turn buttons. As shown in FIG. 3B, the pin may be pushed in to allow for rotation. In various embodiments, the locking mechanism 222 may be a detent pin. The detent pin may be a spring loaded pin that fits into a socket or it may be a ball in a groove to prevent unwanted movement. For instance, the central shaft 218 may be held by a detent pin, such that a slight force (e.g., by the user) is required to release the detent pin and pull the central shaft 218 proximally. The T-divider 200 may include a plurality of locking mechanisms 222. For instance, the T-divider 200 may include multiple detent pins along the line of rotation. In various embodiments, the locking mechanism 222 may be a spring, a magnet, or other suitable restraint.

Figure 4A:
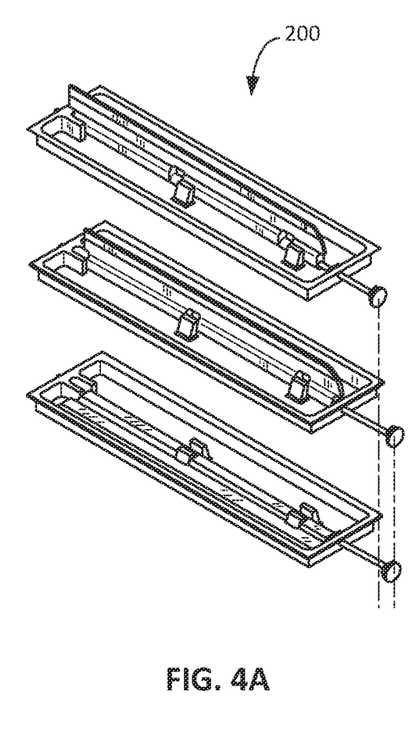
FIG. 4A is a perspective view of a T-divider, in accordance with various embodiments.

Referring now to FIG. 4A, the rotation of the T-divider 200 is illustrated. In the stowed orientation, the moveable portion is linearly aligned with the carts 106, 108 to restrict lateral movement of the carts stowed in the first bay 102 and second bay 104. The moveable portion 208 is positioned upright between each of the plurality of restraining lugs 214 (see also, e.g., FIG. 2A). The knob 220 may be pulled proximally to move the central shaft 218 and in turn, the moveable portion 208 proximally until the plurality of restraining lugs 214 align with the plurality of recesses 216 (see also, e.g., FIG. 2B). The knob 220 may be rotated clockwise or counterclockwise to move the moveable portion 208 into the first cavity 210 or the second cavity 212 (see also, e.g., FIG. 2C). The T-divider 200 may then be locked into the rotated and retracted position/removal orientation. In the removal orientation 210, the carts 106, 108 are then free to rotate sufficiently to bypass the obstructions caused by the surrounding aircraft structure and be removed from the first and second bays 102, 104.

Figure 4B:
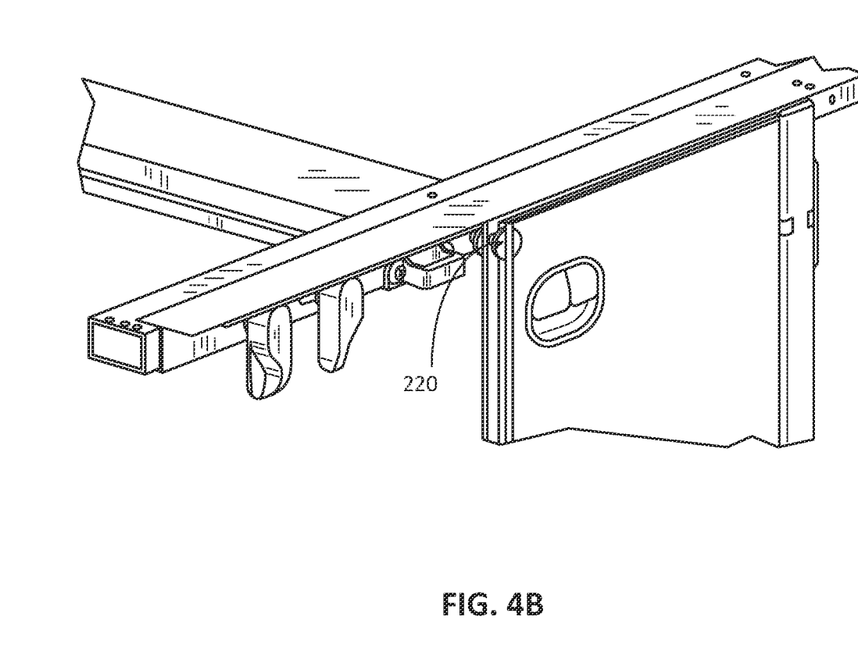
FIG. 4B is a perspective view of a knob of the T-divider of FIG. 4A, in accordance with various embodiments.

As a safety mechanism, referring now to FIG. 4B, the knob 220 may be extended approximately 20 mm in the removal orientation, thus blocking a bay door. In other words, the knob 220 is visible when the T-divider 200 is not fully locked into position and the bay door cannot be closed, thus indicated that the carts 106, 108 are not secured.

Figure 6A:
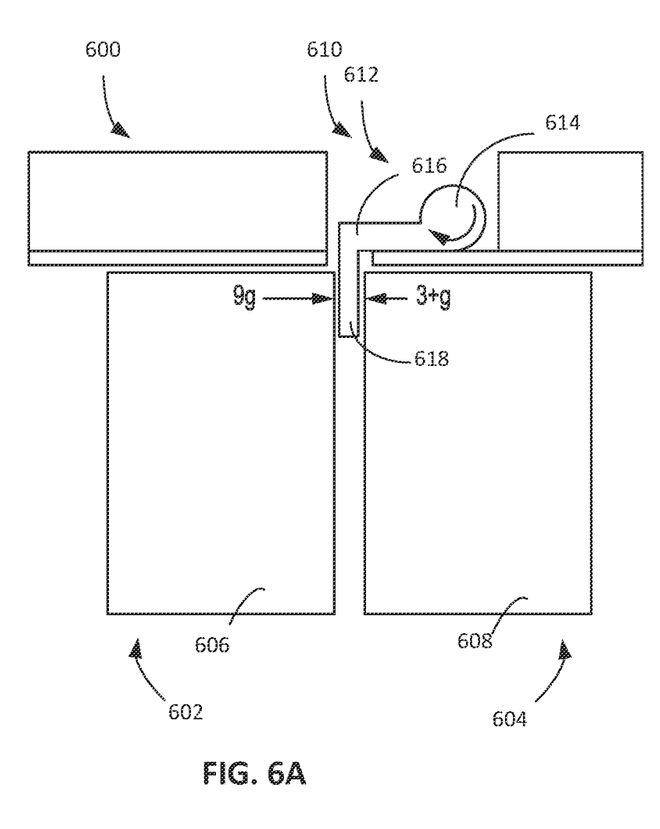
FIGS. 6A-6B are front views of a T-divider, in accordance with various embodiments.
Figure 6B:
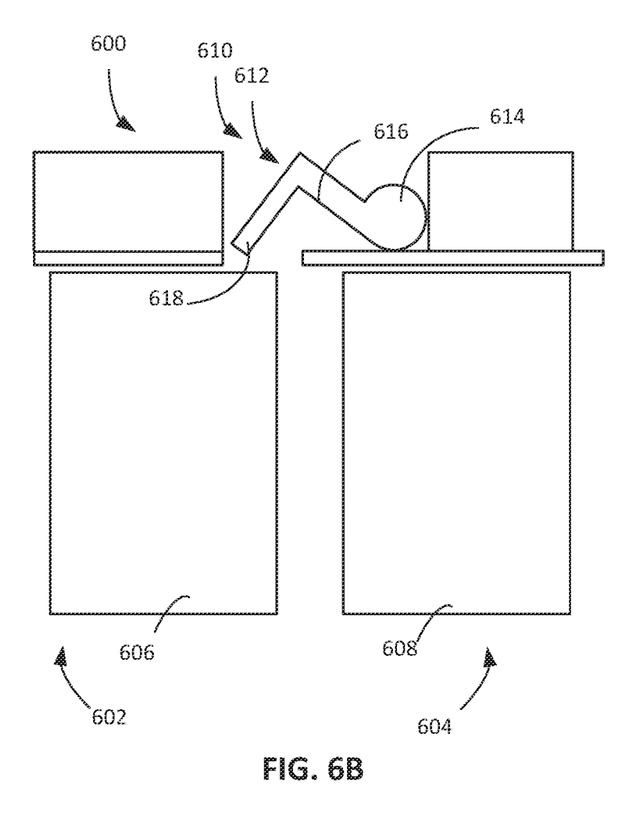

Referring now to FIGS. 6A-6B, front views of a T-divider are illustrated in accordance with various embodiments. FIGS. 6A-6B illustrate an alternate configuration that allows the T-divider to load against a bottom structure rather than lugs (e.g., lugs 214). Similar to FIGS. 1-2, galley 600 may have at least one cart stowage bay (e.g., the first bay 602 and the second bay 604) storing a first cart 606 and a second cart 608. A T-divider 610 defines a boundary between the first bay 602 and the second bay 604. The T-divider 610 may comprise similar components to that of the T-divider 200 as described with reference to FIGS. 2A-2E. For instance, the T-divider may include a housing (e.g., the housing 202) and a central shaft (e.g., the central shaft 218).

FIGS. 6A-6B illustrate a rotating offset to take side load. For instance, the T-divider 610 may include a moveable portion 612. The moveable portion 612 is configured to rotate about a pivot point 614. The moveable portion 612 may include a first portion 616 and a second portion 618 extending perpendicularly from the first portion 616 such that the moveable portion 612 is substantially "L" shaped. The first portion 616 is coupled to the pivot point 614. The second portion 618 may extend between the first cart 606 and the second cart 608 in a stowed orientation (e.g., see FIG. 6A) to secure the first and second cart 606, 608 in place. The pivot point 614 may include a knob such that the moveable portion 612 is coupled to the knob/pivot point 614. The knob is configured to facilitate a user to rotate the moveable portion 612 about the pivot point 614. Due to the "L" shape of the moveable portion 612, the T-divider 610 may be rotated about the pivot point 614 without the need to remove the first 606 from the first bay 602 prior to rotation. When in the stowed orientation, the T-divider 610 is configured to withstand loads applied to the T-diver 610 when the aircraft is in motion. For instance, the first cart 606 may apply a force up to 9G against the second portion 618. Further, the second cart 608 may apply a force of at least 3G against the second portion 618. Accordingly, due to the configuration of the T-divider 610, the T-divider 610 can retain the first and second carts 606, 608 in the stowed orientation while the aircraft is in motion.

Figure 7A:
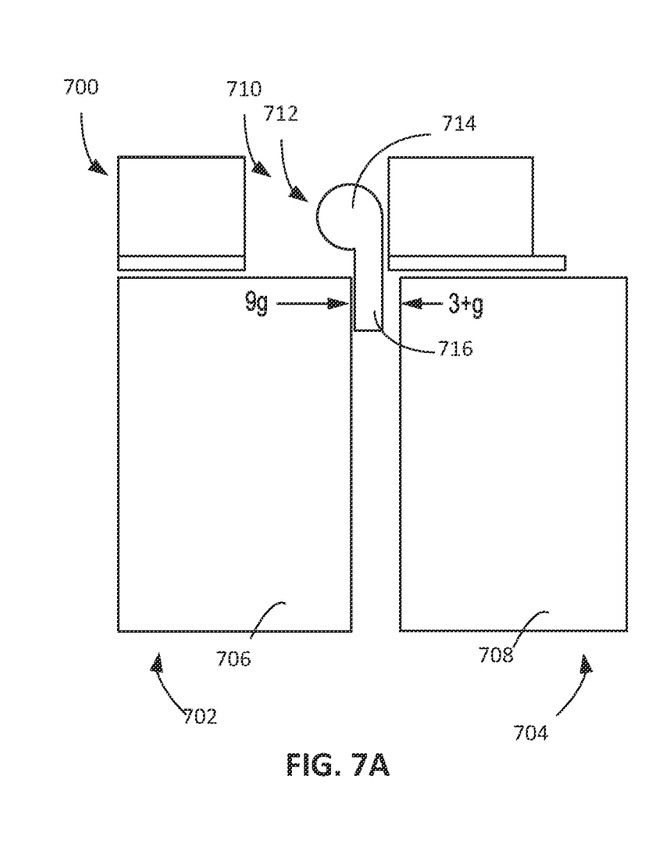
FIGS. 7A-7B are front views of a T-divider, in accordance with various embodiments.
Figure 7B:
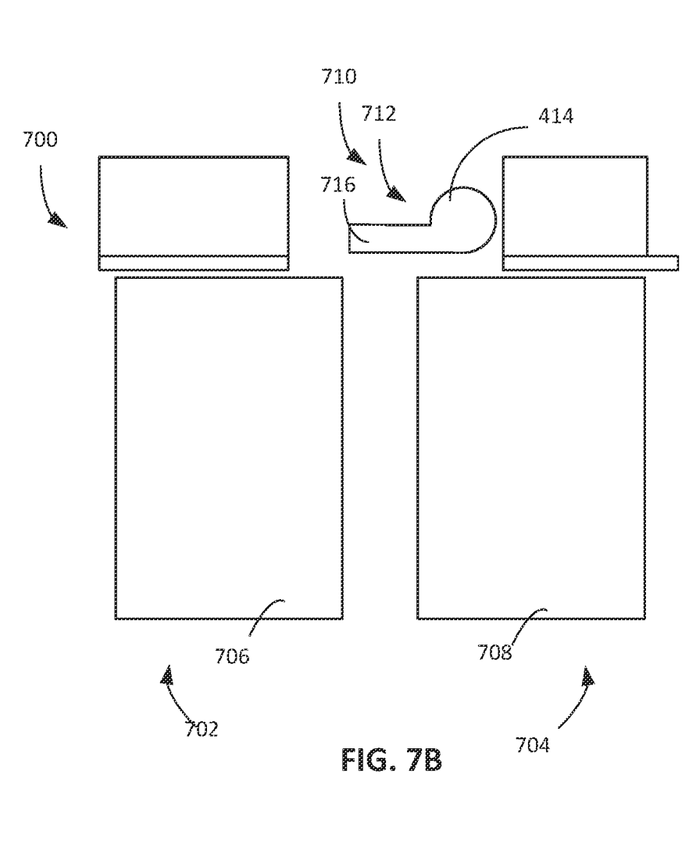

FIGS. 7A-7B are front views of a T-divider, in accordance with various embodiments. FIGS. 7A-7B illustrate an alternate configuration that allows the T-divider to load against a side structure rather than lugs (e.g., lugs 214). Similar to FIGS. 1-2, galley 700 may have at least one cart stowage bay (e.g., the first bay 702 and the second bay 704) storing a first cart 706 and a second cart 708. A T-divider 710 defines a boundary between the first bay 702 and the second bay 704. The T-divider 710 may comprise similar components to that of the T-divider 200 as described with reference to FIGS. 2A-2E. For instance, the T-divider may include a housing (e.g., the housing 202) and a central shaft (e.g., the central shaft 218). However, T-divider 720 does not include restraining lugs.

FIGS. 7A-7B illustrate a configuration of the T-divider 710 with a straight down leg. For instance, the T-divider 710 may include a moveable portion 712. The moveable portion 712 is configured to rotate about a pivot point 714. The moveable portion 712 may include a straight leg 716 extending from the pivot point 714. The straight leg 716 is coupled to the pivot point 714. The straight let 716 may extend between the first cart 706 and the second cart 708 in a stowed orientation (e.g., see FIG. 7A) to secure the first and second cart 706, 708 in place. The pivot point 714 may include a knob such that the moveable portion 712 is coupled to the knob/pivot point 714. The knob is configured to facilitate a user to rotate the moveable portion 712 about the pivot point 714. For instance, the knob may be used to rotate the moveable portion 712 about the pivot point 714 without needing to When in the stowed orientation, the T-divider 710 is configured to withstand loads applied to the T-diver 610 when the aircraft is in motion. For instance, the first cart 706 may apply a force up to 9G against the straight let 716. Further, the second cart 708 may apply a force of at least 3G against the straight leg 716. Accordingly, due to the configuration of the T-divider 710, the T-divider 710 can retain the first and second carts 706, 708 in the stowed orientation while the aircraft is in motion.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment: for example, A and B, A and C, B and C, or A and B and C. Different cross-hatching is used throughout the figures to denote different parts but not necessarily to denote the same or different materials.

Systems, methods and apparatus are provided herein. In the detailed description herein, references to "one embodiment," "an embodiment," "various embodiments," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Numbers, percentages, or other values stated herein are intended to include that value, and also other values that are about or approximately equal to the stated value, as would be appreciated by one of ordinary skill in the art encompassed by various embodiments of the present disclosure. A stated value should therefore be interpreted broadly enough to encompass values that are at least close enough to the stated value to perform a desired function or achieve a desired result. The stated values include at least the variation to be expected in a suitable industrial process, and may include values that are within 10%, within 5%, within 1%, within 0.1%, or within 0.01% of a stated value. Additionally, the terms "substantially," "about" or "approximately" as used herein represent an amount close to the stated amount that still performs a desired function or achieves a desired result. For example, the term "substantially," "about" or "approximately" may refer to an amount that is within 10% of, within 5% of, within 1% of, within 0.1% of, and within 0.01% of a stated amount or value.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f) unless the element is expressly recited using the phrase "means for." As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

Finally, it should be understood that any of the above described concepts can be used alone or in combination with any or all of the other above described concepts. Although various embodiments have been disclosed and described, one of ordinary skill in this art would recognize that certain modifications would come within the scope of this disclosure. Accordingly, the description is not intended to be exhaustive or to limit the principles described or illustrated herein to any precise form. Many modifications and variations are possible in light of the above teaching.

What is claimed is:
1. A T-divider comprising:
a housing defining a proximal end, a distal end, a first cavity extending between the proximal end and the distal end, and a second cavity extending between the proximal end and the distal end, the housing extending along a longitudinal axis;
a moveable portion disposed in the housing and extending between the proximal end and the distal end, the movable portion configured to rotate about the longitudinal axis from a stowed orientation to a removal orientation; and
a plurality of restraining lugs disposed within the first cavity and the second cavity such that the plurality of restraining lugs is disposed on either side of the moveable portion, wherein the plurality of restraining lugs is fixed within the housing such that the restraining lugs are configured to restrain the moveable portion in the stowed orientation.

2. The T-divider of claim 1, further comprising a plurality of recesses disposed along the moveable portion.

3. The T-divider of claim 2, wherein the plurality of recesses is configured to correspond with the plurality of restraining lugs such that the plurality of recesses allows the moveable portion to rotate about the longitudinal axis when the plurality of recesses aligns with the plurality of restraining lugs.

4. The T-divider of claim 1, further comprising a central shaft coupled to the moveable portion, the central shaft configured to rotate the moveable portion.

5. The T-divider of claim 4, further comprising a locking mechanism configured to secure the moveable portion in the stowed orientation.

6. The T-divider of claim 5, wherein the moveable portion comprises a first portion and a second portion extending perpendicularly from the first portion.

7. An aircraft galley comprising:
at least one cart;
a cart bay configured to store the at least one cart;
a T-divider configured to restrict lateral movement of the at least one cart within the cart bay when the T-divider is in a stowed orientation and allows the at least one cart to be removed from the cart bay around an obstruction when in a removal orientation, the T-divider comprising:
a housing defining a proximal end, a distal end, a first cavity extending between the proximal end and the distal end, and a second cavity extending between the proximal end and the distal end, the housing extending along a longitudinal axis;
a moveable portion disposed in the housing and extending between the proximal end and the distal end, the movable portion configured to rotate about the longitudinal axis from a stowed orientation to a removal orientation; and
a plurality of restraining lugs disposed within the first cavity and the second cavity such that the plurality of restraining lugs is disposed on either side of the moveable portion, wherein the plurality of restraining lugs is fixed within the housing such that the restraining lugs are configured to restrain the moveable portion in the stowed orientation.

8. The aircraft galley of claim 7, further comprising a plurality of recesses disposed along the moveable portion.

9. The aircraft galley of claim 8, wherein the plurality of recesses is configured to correspond with the plurality of restraining lugs such that the plurality of recesses allows the moveable portion to rotate about the longitudinal axis when the plurality of recesses aligns with the plurality of restraining lugs.

10. The aircraft galley of claim 7, further comprising a central shaft coupled to the moveable portion, the central shaft configured to rotate the moveable portion.

11. The aircraft galley of claim 10, further comprising a locking mechanism configured to secure the moveable portion in the stowed orientation.

* * * * *